(12) United States Patent
Kraft et al.

(10) Patent No.: US 7,610,365 B1
(45) Date of Patent: Oct. 27, 2009

(54) AUTOMATIC RELEVANCE-BASED PRELOADING OF RELEVANT INFORMATION IN PORTABLE DEVICES

(75) Inventors: Reiner Kraft, Gilroy, CA (US); Jussi Petri Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2449 days.

(21) Appl. No.: 09/783,666

(22) Filed: Feb. 14, 2001

(51) Int. Cl.
*G06F 15/173* (2006.01)

(52) U.S. Cl. .................. 709/223; 709/203; 709/217; 709/220; 709/245; 709/246; 709/248; 707/3; 705/6; 705/8

(58) Field of Classification Search .......... 709/223, 709/225, 226, 203, 217, 220, 245, 246, 248; 701/201; 705/6, 8; 707/3
See application file for complete search history.

(56) References Cited

U.S. PATENT DOCUMENTS

| | | | |
|---|---|---|---|
| 5,446,891 A | 8/1995 | Kaplan et al. | |
| 5,724,567 A | 3/1998 | Rose et al. | |
| 5,948,040 A * | 9/1999 | DeLorme et al. | 701/201 |
| 6,026,388 A * | 2/2000 | Liddy et al. | 707/1 |
| 6,078,892 A | 6/2000 | Anderson et al. | |
| 6,252,544 B1 * | 6/2001 | Hoffberg | 342/357.1 |
| 6,356,936 B1 * | 3/2002 | Donoho et al. | 709/206 |

* cited by examiner

*Primary Examiner*—Nathan J Flynn
*Assistant Examiner*—Mohammad A Siddiqi
(74) *Attorney, Agent, or Firm*—Cantor Colburn LLP; Leonard Guzman

(57) ABSTRACT

A system for automatic proximity-based preloading of relevant information in portable devices pre-loads a portable device such as a mobile telephone, a personal digital assistant (PDA) or portable computer before the occurrence of a trip or event, with information relevant to the user's current or upcoming tasks. The system locates and loads into the portable device only the information required by the user for near term projects, meetings, or trips. The system is generally comprised of an information catalog, a proximity estimator, a relevance estimator, an information retriever, and a device loader. The information catalog contains a list of the information sources and items to which the user has access and from which the system of the invention will retrieve data to be loaded into the mobile device. The proximity estimator determines the proximity of various relevant information items to the user's tasks based on distance, time, and/or association. The relevance estimator combines these proximity measures into a single relevance score. The most relevant information is retrieved by the information retriever and loaded onto the portable device by the device loader.

10 Claims, 2 Drawing Sheets

AUTOMATIC RELEVANCE-BASED PRELOADING OF RELEVANT INFORMATION IN PORTABLE DEVICES

CROSS-REFERENCE TO RELATED APPLICATION

This application is related to copending U.S. patent application Ser. No. 09/769,452, entitled "Wireless Communication System and Method for Sorting Location Related Information," filed on Jan. 26, 2001, identified by and assigned to the same assignee as the present application, and incorporated herein by reference.

FIELD OF THE INVENTION

This invention generally relates to the field of integrated computing and communication, and particularly to a computer software program that analyzes the relevance of stored information to current or scheduled activities, sorts this information based upon relevance, and transfers the most relevant information to a communication device. More specifically, the communication device is a mobile device with limited memory and storage resources, such as a PDA or a mobile telephone.

BACKGROUND OF THE INVENTION

Rapid advances are being made in the field of wireless communication. An increasing number of applications are being developed for the wireless device platform, ranging, for example, from smart cellular phones to two-way text pagers. As the use of mobile devices becomes more prevalent, users will become more dependent on the data they carry with them. Portable devices, in order to be small, have a limited amount of power source (i.e., battery) and memory and storage space. Consequently, every piece of information stored on a mobile device needs to be relevant to the user's needs, especially when the user is in a network-disconnected mode such as on a trip.

Given that the displays in mobile devices are typically very limited in size, it is also very difficult for mobile users to retrieve and browse the data they carry. For instance, conventional cellular phones can store hundreds of telephone numbers, yet the mechanism for selecting a number from the directory is somewhat cumbersome. The user either has to scroll through the entire listing to find the number to call, or he/she has to type in the name (or part thereof) of the party to call. The limited functionality of keyboards in mobile devices complicates this process.

Therefore, there is still a need for a system having the ability to optimize information stored in a mobile device based upon the relevance to a user's schedule, location, activities, calendar, etc. The need for such a system has heretofore remained unsatisfied.

SUMMARY OF THE INVENTION

The system and associated method for automatic relevance-based preloading of relevant information in portable devices satisfies this need. The system of the present invention pre-loads a portable device, before the occurrence of a trip or event, with information relevant to the user's current or upcoming tasks. The system locates and loads into the portable device only the information required by the user for near term or current tasks such as projects, meetings, trips, events, etc. This allows the user to maximize the memory capabilities of portable devices and to facilitate the location and retrieval of information.

In addition, the system will sort the information stored in the portable device so that the data required most often for the trip or event is easiest to access. The portable device can be for example a wireless personal digital assistant (PDA) communication device, a mobile telephone, a personal computer configured for use within a local wireless network, or a similar computing and/or communications system.

Identifying relevant information prior to the occurrence of an event, meeting, or trip, and pre-loading the same onto the portable device, ensures that the user carries information that he or she is most likely to need, including information the user did not anticipate needing. For instance, when traveling in a foreign country, it is useful to pre-load the telephone book of a wireless device with the telephone numbers of the police, fire department, hospitals, and embassies. A dictionary of most commonly used terms in the foreign language could also be preloaded.

Since only a limited amount of information can be stored on a portable device, the potentially "relevant information" items need to be sorted according to relevance so that only the most relevant information is transferred to, and stored onto the portable device. As used herein, "relevance of information" includes the "proximity" of the information items to specific user's tasks. Tasks can be related, for example, to people or events (e.g. meetings scheduled in the user's calendar), locations (e.g. company visits listed in the user's to-do list), and/or time (e.g. tasks for the next few days).

"Proximity" is measured in terms of distance, time, and/or association. For instance, a city that is near the location of a company the user will be visiting has a high (distance) proximity and relevance. An event that occurs at about the same time as a user's trip to a foreign destination also has a high (temporal) proximity and relevance. Similarly, a person or organization associated with the near-term task that is listed in the user's to-do list or address book is also (associatively) relevant.

An information item that is "near" in terms of all three measures (distance, time, and association) has the highest relevance. For instance, a user who will be visiting Paris next week might have the name of an old school friend in Paris in his or her address book. The system of the present invention rates the current contact information for that friend high in terms of relevance and loads that information onto the portable device.

The relevance-based preloading system of the present invention generally includes an information catalog, a proximity estimator, a relevance estimator, an information retriever, and a device loader. The retrieved information is accumulated from a variety of sources, including but not limited to the user's desktop computer, the user's corporate intranet, the user's portable device and web pages on the Internet.

One benefit of the relevance-based preloading system of the present invention is to facilitate the following actions for the user: browsing, selection, and use of the information stored in the portable device. Current and future portable devices are expected to hold much more information than can be conveniently accessed. However, small displays and limited input devices such as keyboards, make it difficult to access or use the data. Presenting the data in a relevance-based sort order allows the user to access local information with minimum effort, for instance with one keystroke instead of ten or more keystrokes when scrolling through a long telephone directory listing.

Another benefit of the present system is to increase the user's awareness of local information, even if this information is not expected to be selected or used. As an example, the user has an increased sense of security by having the ability to access the names, addresses, and telephone numbers of nearby hospitals and commercial establishments such as auto repair facilities.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

The following definitions and explanations provide background information pertaining to the technical field of the present invention, and are intended to facilitate the understanding of the present invention without limiting its scope:

Internet: A collection of interconnected public and private computer networks that are linked together with routers by a set of standard protocols to form a global, distributed network.

Intranet: A collection of interconnected private computer networks that are linked together with routers by a set of standard protocols to form a distributed network within a business or other organization.

Web site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW, also Web): An Internet client—server hypertext distributed information retrieval system.

Figure 1:
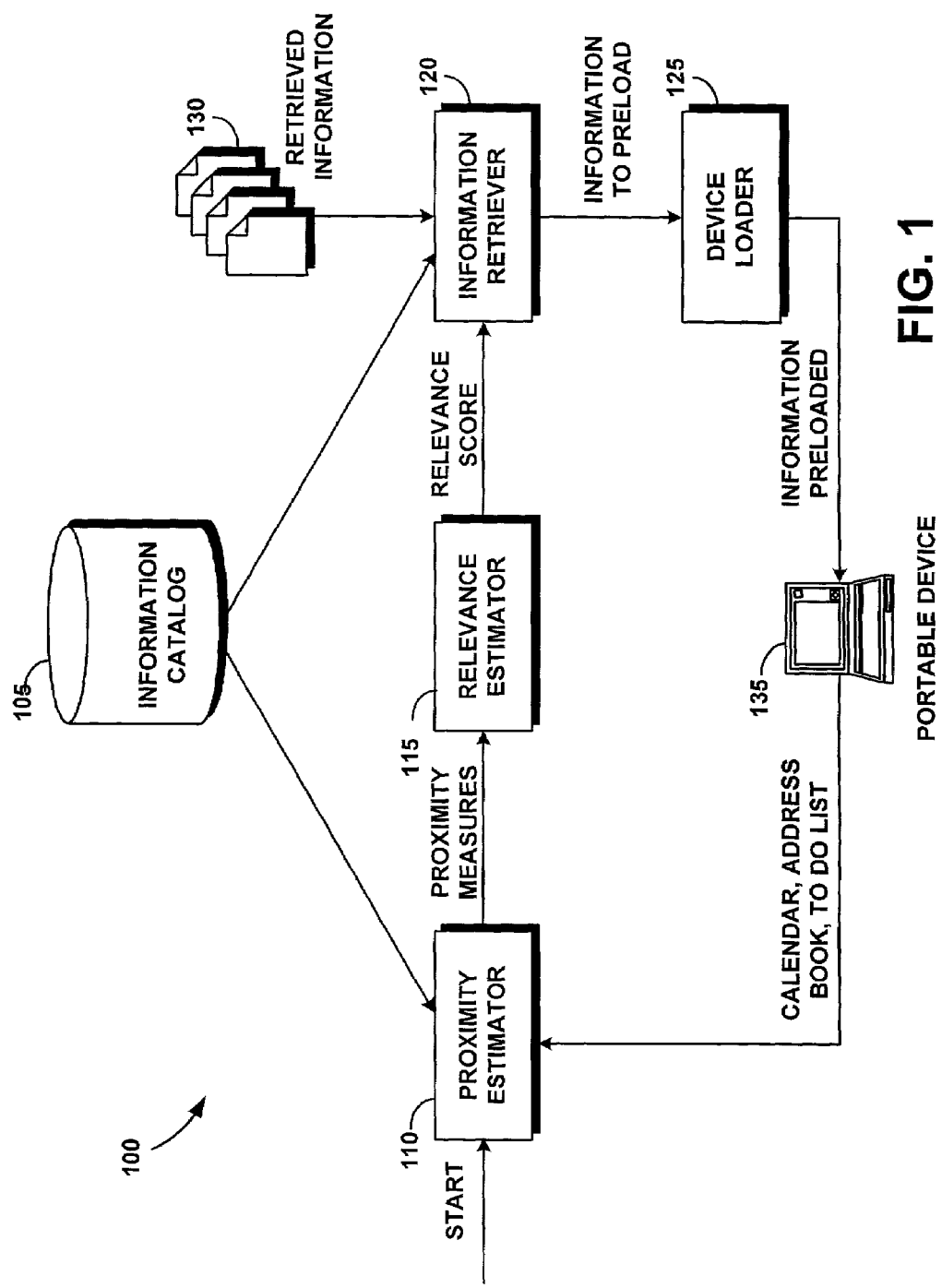
FIG. 1 is a detailed block diagram of the automatic proximity-based pre-loading device.

FIG. 1 illustrates a high level architecture of an exemplary system 100 for automatically selecting and pre-loading proximity-based relevant information onto one or more portable devices 135. The system 100 generally includes the following components:

an information catalog 105 that contains the list of information sources and items to which the user has access and from which the system of the present invention will retrieve data to be loaded onto the portable device 135;

a proximity estimator 110 that determines the proximity of various information items to the user's tasks based on distance, time, and association;

a relevance estimator 115 that combines the three proximity measures into a single relevance score by, for example, computing their geometric mean;

an information retriever 120 that retrieves information items 130 that are to be preloaded onto the portable device 135; and a device loader 125 that processes information items 130 retrieved by the information retriever 120 and loads them onto the portable device 135. As used herein, the retrieved information 130 is accumulated from a variety of sources, including but not limited to the user's desktop computer, the user's corporate intranet, the user's portable device 135 and web pages on the Internet.

The information catalog 105 contains a list of information sources and items to which the user has access. For instance, a user has access to public information sources such as maps, news, weather information, and telephone books through the Internet. The user naturally also has access to his or her private files on a desktop computer, some of which the user may want to carry on a trip depending on their relevance to the current and/or near-term tasks ("tasks"). In addition, the user has access to corporate files that also might be relevant to these tasks.

The information catalog 105 contains metadata about each information source. This metadata includes but is not limited to:

information location (e.g. Web address);

type of information (e.g. "map", "weather", and "contact information");

user identifier or ID; and/or user passwords for accessing the information sources.

The proximity estimator 110 is responsible for determining the proximity of various information items to the user's tasks. In one embodiment, the following three measures of proximity are used, though in other embodiments different proximity measures may be used:

Distance: denotes the difference between the user's planned location for a given task and the location of various scheduled tasks or other geographically pertinent information Time: denotes the immediacy of the tasks in the user's schedule.

Association: denotes the people and contacts that are associated with the location and purpose of a given task (e.g., client meeting in a particular city).

To determine the distance of an information item to the user's current or future location, the proximity estimator 110 relies on location information retrieved for example from the user's calendar or from a location tracker such as a GPS. As an illustration, either the user's calendar or the location tracker informs the proximity estimator 110 that the user is currently in San Jose, Calif., but according to the user's calendar, the user will travel to Paris next week. As a result, the proximity estimator 110 rates information about people or organizations in or near Paris as relevant to the user. However, the proximity estimator 110 rates the temporal relevance for the trip to Paris lower than that of other information that pertains to the user's current activities since the trip is scheduled for the next week.

The association proximity measurement relies for example on those people explicitly indicated in the user's address book and to-do list. The system 100 includes by default, information such as telephone numbers of police, fire department, hospitals, and embassies. This information is generally important although not explicitly listed in the user's address book.

The information type of each item determines the proximity measurement or measurements that can be used more effectively. As an example, the proximity measure used for maps is distance; the proximity measure used for weather information includes distance and time. The proximity measures used for news and contact information relates to people and organizations, and therefore includes the associative measure.

The user's private files typically relate to people, organizations, or projects. A linguistic analysis of those documents by the proximity estimator 110 discerns whether a particular document is associated with a person or organization in the user's address book, or related to a project listed in the user's to-do list or calendar. Alternatively, the user can explicitly indicate to the proximity estimator 110 that a document is related to a specific location (e.g. driving instructions) or time (e.g. wedding plans).

These three proximity measures may vary from zero to infinity, with zero indicating that an item is adjacent to, or co-located with the user, and infinity indicating that the item is infinitely far from the user in distance, time, or association. Once the three proximity measures are calculated for each item in the information catalog, they are sent by the proximity estimator 110 to the relevance estimator 115.

The relevance estimator 115 combines the three proximity measures into a single relevance score. In one embodiment, the relevance estimator 115 computes the relevance score by weighting and each of the proximity measurements, and adding and averaging the weighted values.

According to another embodiment, the relevance estimator 115 computes the relevance score by computing the geometric mean of the proximity measurements. This increases the relevance of items that are "near" in terms of all three proximity measurements, while rapidly decreasing the relevance of items that are distant in one or more proximity measurement. The following equation may be used for computing the relevance score (R):

$$R = \sqrt[3]{distance * time * association}$$

where distance, time, and association vary from zero to infinity, and the closer R is to zero, the more relevant an item of information is to the task.

The information retriever 120 retrieves information items 130 that are to be preloaded onto the portable device 135. The metadata for an information item is retrieved from the information catalog 105 and the item (e.g. telephone number) is retrieved from the information source (e.g. telephone book). The retrieved information 130 may be located on the Internet, the corporate intranet, the user's own desktop computer, or the portable device 135. The information retriever 120 then transfers the selected items to the device loader 125 for loading onto the portable device 135.

The device loader 125 processes the documents or other information items in the retrieved information 130 and loads them onto the portable device 135. Each type of portable device 135 typically has a predefined protocol for information transfer. As an illustration, for a personal digital organizer that uses software utilities, such as synchronization software to move data between a desktop computer and itself, the device loader 125 works in conjunction with such utilities by:

adding new information items to the device loader 125;

removing items that are no longer relevant to the user's current or near-term tasks; and/or updating items that have changed.

Figure 2:
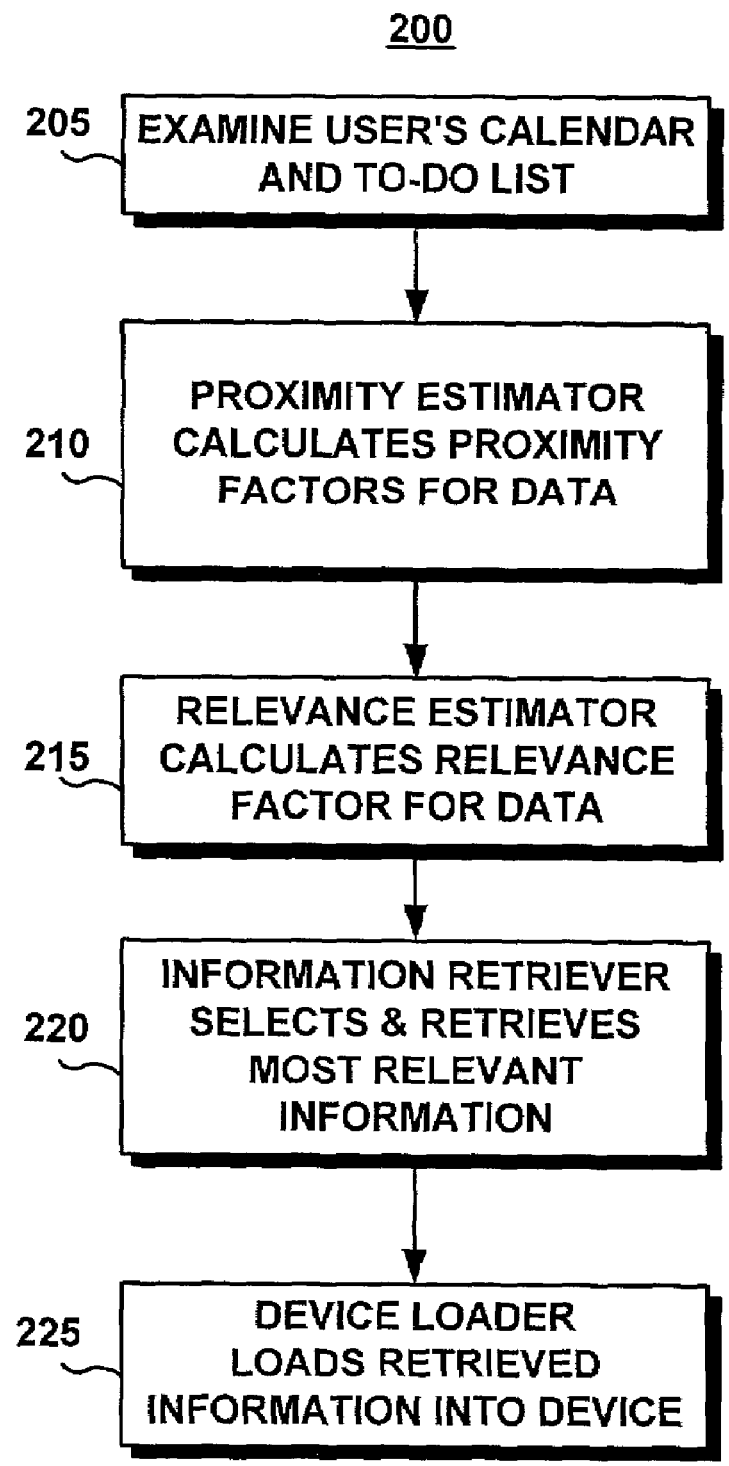
FIG. 2 is a flow chart that depicts the operation of the automatic proximity-based pre-loading system of FIGS. 1-2.

In operation, and with further reference to a method of use 200 of FIG. 2, a hypothetical user maintains a file on his or her personal desktop computer that stores the names and telephone numbers of his or her colleagues at work. These colleagues work at many different locations across the United States, and each work location is in a different area code. When the user travels from his or her "home" work location to visit a colleague at another work location, he or she is more likely to contact people at that location rather than those at other locations. In this illustration, the user's address book contains over 1,500 names and numbers, many more than will fit in the memory of a common mobile telephone.

The system 100 first examines the user's calendar at step 205 and notes that the user will be traveling tomorrow from his or her home base of New York, N.Y. to San Jose, Calif. The proximity estimator 110 calculates the proximity of each phone entry based on the location and association at step 210. The relevance estimator 115 at step 215 determines that the phone numbers with area codes 408, 415, and 650 (those used in the San Jose/San Francisco, Calif. area) are most relevant.

The relevance estimator 115 then scans the user's telephone list and sorts the contents so that those area codes are listed first, followed by telephone numbers in the user's "home" work location (area code 212). The information retriever 120 selects and retrieves these phone numbers at step 220 from the user's phone list plus any default phone numbers such as those for police, emergency, etc.

In one embodiment of the present invention, the information retriever 120 has the ability to use data mining techniques to discover relevant associations. One such association correlates the relevance score of addresses, telephone numbers, or contact names to documents created by word processors, spread sheet software, etc. As a result of such association, the information retriever 120 retrieves the most relevant documents that are associated with the entries having the highest relevance score.

Returning now to FIG. 2, the copy process then begins at step 225 and as many numbers as will fit are copied to the mobile phone by the device loader 125. When the user returns to his or her "home" work location, he or she synchronizes the mobile phone to the desktop computer. The method 200 can be integrated with the synchronization process so that the system 100 repeats steps 205 through 225. Unless the user has another trip scheduled, the telephone list is sorted with numbers closest to his or her "home" work location appearing first and those numbers are replaced on the user's mobile phone.

The telephone number lists below demonstrate the sorting and selection performed by the system 100. The user's list on his or her desktop computer contains the following telephone numbers:

212-555-1012
212-555-1232
212-555-8522
212-555-1231
968-555-1305
893-555-9309
650-555-1293
415-555-1239
284-555-2933
408-555-7698
415-555-3930
650-555-7942
212-555-3293
.
.
.
683-555-2984.

The user's list is sorted according to relevance and copied to a mobile phone for his or her trip to San Jose, Calif. with area codes 408, 415, and 650. Assuming the mobile phone has capacity for storing 10 numbers, the numbers copied are:

408-555-7698
415-555-1239
415-555-3930
650-555-1293
650-555-7942
212-555-1012

212-555-1232
212-555-8522
212-555-1231
212-555-3293.

The user's list is sorted again and recopied to the user's mobile phone upon return to the "home" work location (area code 212). Based on the same assumption that the mobile phone has capacity for storing 10 numbers, the phone memory now contains the following numbers following the synchronization process:

212-555-1012
212-555-1232
212-555-8522
212-555-1231
212-555-3293
414-555-6243
863-555-9329
968-555-1305
893-555-9309
284-555-2933.

It is to be understood that the specific embodiments of the invention that have been described are merely illustrative of certain application of the principle of the present invention. Numerous modifications may be made to system and method for automatic proximity-based pre-loading of relevant information in portable devices described herein without departing from the spirit and scope of the present invention. Moreover, while the present invention is described for illustration purpose only in relation to portable devices, it should be clear that the invention is applicable as well to any device with limited memory and/or storage resources.

What is claimed is:

1. A method for automatic relevance-based preloading data to a computing device, comprising:

identifying any one or more of persons or current scheduled tasks prior to the occurrence of the tasks;

analyzing the relevance of stored data to any one or more of the current scheduled tasks or persons;

sorting the stored data based upon the relevance to any one or more of the current scheduled tasks or persons;

setting a predetermined relevance threshold;

automatically preloading selected sorted data to the computing device with a relevance score higher than the relevance threshold; and wherein analyzing the relevance score comprises estimating a proximity of the stored data items to any one or more of persons or current scheduled tasks, based on an association proximity measure and at least one proximity measure.

2. The method of claim 1, wherein analyzing the relevance includes estimating a proximity of the stored data items to the any one or more of persons or current scheduled tasks, based on the combination of three proximity measures: distance, time, association.

3. The method of claim 1, wherein analyzing the relevance further includes combining the at least three proximity measures into a single relevance score.

4. The method of claim 1, wherein analyzing the relevance includes analyzing the proximity of information items to any one or more of the current scheduled tasks or persons.

5. The method of claim 1, wherein analyzing the proximity of information items includes measuring proximity in terms of a combination of the association measure along with any one of location and/or time.

6. The method of claim 1, wherein preloading selected sorted data to the computing device includes preloading the data to a communication device.

7. The method of claim 6, wherein preloading the data to the communication device includes preloading the data to a mobile telephone.

8. The method of claim 6, wherein preloading the data to the communication device includes preloading the data to a personal digital assistant (PDA) device.

9. The method of claim 1, wherein preloading the data includes preloading the data to a personal computer.

10. The method of claim 1, wherein identifying any one or more of current scheduled tasks or persons includes identifying events scheduled in a user's calendar, locations, and/or time frames.

\* \* \* \* \*

UNITED STATES PATENT AND TRADEMARK OFFICE
CERTIFICATE OF CORRECTION

PATENT NO. : 7,610,365 B1
APPLICATION NO. : 09/783666
DATED : October 27, 2009
INVENTOR(S) : Kraft et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2171 days.

Signed and Sealed this

Twelfth Day of October, 2010

David J. Kappos
*Director of the United States Patent and Trademark Office*